(12) United States Patent
Finnigan

(10) Patent No.: US 6,443,578 B1
(45) Date of Patent: Sep. 3, 2002

(54) PERSONAL SHOWER MIRROR

(76) Inventor: David Patrick Finnigan, 3007 S. Emerald Ave., Chicago, IL (US) 60616

( * ) Notice: Subject to any disclaimer, the term of this patent is extended or adjusted under 35 U.S.C. 154(b) by 0 days.

(21) Appl. No.: 09/766,796

(22) Filed: Jan. 22, 2001

(51) Int. Cl.[7] ................................................. G02B 5/12
(52) U.S. Cl. ....................... 359/512; 359/507; 359/509; 359/844; 359/872; 359/871; 359/860
(58) Field of Search .................. 359/507, 509, 359/512, 844, 872, 960, 871

(56) References Cited

U.S. PATENT DOCUMENTS

| | | |
|---|---|---|
| 1,633,120 A * | 6/1927 | Miller ........................ 359/860 |
| 4,701,594 A | 10/1987 | Powell |
| 4,733,468 A | 3/1988 | Zadro |
| 5,604,633 A | 2/1997 | Christianson |
| 6,149,277 A | 11/2000 | Broussard |

* cited by examiner

*Primary Examiner*—Mohammad Sikder
(74) *Attorney, Agent, or Firm*—McDonnell, Boehnen, Hulbert & Berghoff

(57) ABSTRACT

A personal shower mirror for attaching to a shower curtain pole or to a sliding glass shower door comprising a mirror element, a housing enclosing the mirror element, a hanging device and an extendable pole connected at one end to the housing and at the other threaded to receive the hanging device.

20 Claims, 3 Drawing Sheets

FRONT VIEW

FRONT VIEW

SIDE VIEW

REAR VIEW

PERSONAL SHOWER MIRROR

BACKGROUND OF THE INVENTION (a) Field of the Invention

This invention relates to a personal use shower mirror. More particularly, the invention relates to an adjustable mirror that is hung from a show curtain rod or from sliding glass shower doors.

(b) Description of the Related Art

In addition to washing while showering, many people like to perform personal grooming tasks. For example, many men prefer to shave their beards while showering. However, in the absence of a mirror to aid in guiding the movement of the razor against the skin, shaving in the shower can be an imprecise, difficult and potentially dangerous task. Other grooming tasks that are more easily done with a mirror include shaving other parts of the body, shampooing, and applying soaps and lotions.

U.S. Pat. No. 6,149,277 to Broussard relates to a fog free shower mirror hung from a showerhead. The height of the mirror, however, cannot be readily adjusted because it is connected to the showerhead. It, therefore, does not contemplate either the height of the person using the mirror in the shower or the body part that the person is grooming.

U.S. Pat. No. 5,604,633 to Christianson discloses a condensation-free shower mirror, which is heated by the hot stream from the shower. Unfortunately, Christianson is designed to interrupt the path of the shower. As such, it will likely cause flooding in the bathroom when high-pressure water from the showerhead is deflected sideways off the mirror.

U.S. Pat. No. 4,701,594 to Powell discloses a combination mirror defogging and drying device. Since Powell must use line level electricity to operate, it is unsuitable for use in the shower.

U.S. Pat. No. 4,733,468 to Zadro discloses a shaving system in which water from the shower is used to generate electricity and to defog the mirror. However, in order to operate, Zadro requires that the device be connected to the shower plumbing. Such connection is beyond the scope of a typical consumer's expertise.

Although these units are suitable for their particular designed purposes, they would not be as suitable for the purposes of the present invention, as hereafter disclosed.

BRIEF DESCRIPTION OF THE INVENTION

The present invention relates to a shower mirror. Accordingly, on object of the invention is to provide a personal shower mirror, comprising a mirror element, a housing enclosing the mirror element, a hanging device and an adjustable pole connecting the housing to the hanging device. The personal shower mirror of the present invention is designed for both home and travel use and is convenient because it can be folded down and stored within seconds.

Another object of the invention is to provide a shower mirror having an adjustable height.

Yet another object of the invention is to provide a shower mirror that can be connected either to a shower curtain pole or to a sliding glass door.

Still another object of the invention is to provide a non-fogging shower mirror.

These and other objects of the present invention will be clear in light of the detailed description below.

To accomplish the above and related objects, the invention may be embodied in the form illustrated in the accompanying drawings. However, the drawings are only illustrative. Variations are contemplated as being part of the invention, limited only by the scope of the claims.

DETAILED DESCRIPTION OF THE PREFERRED EMBODIMENTS

Figure 1:
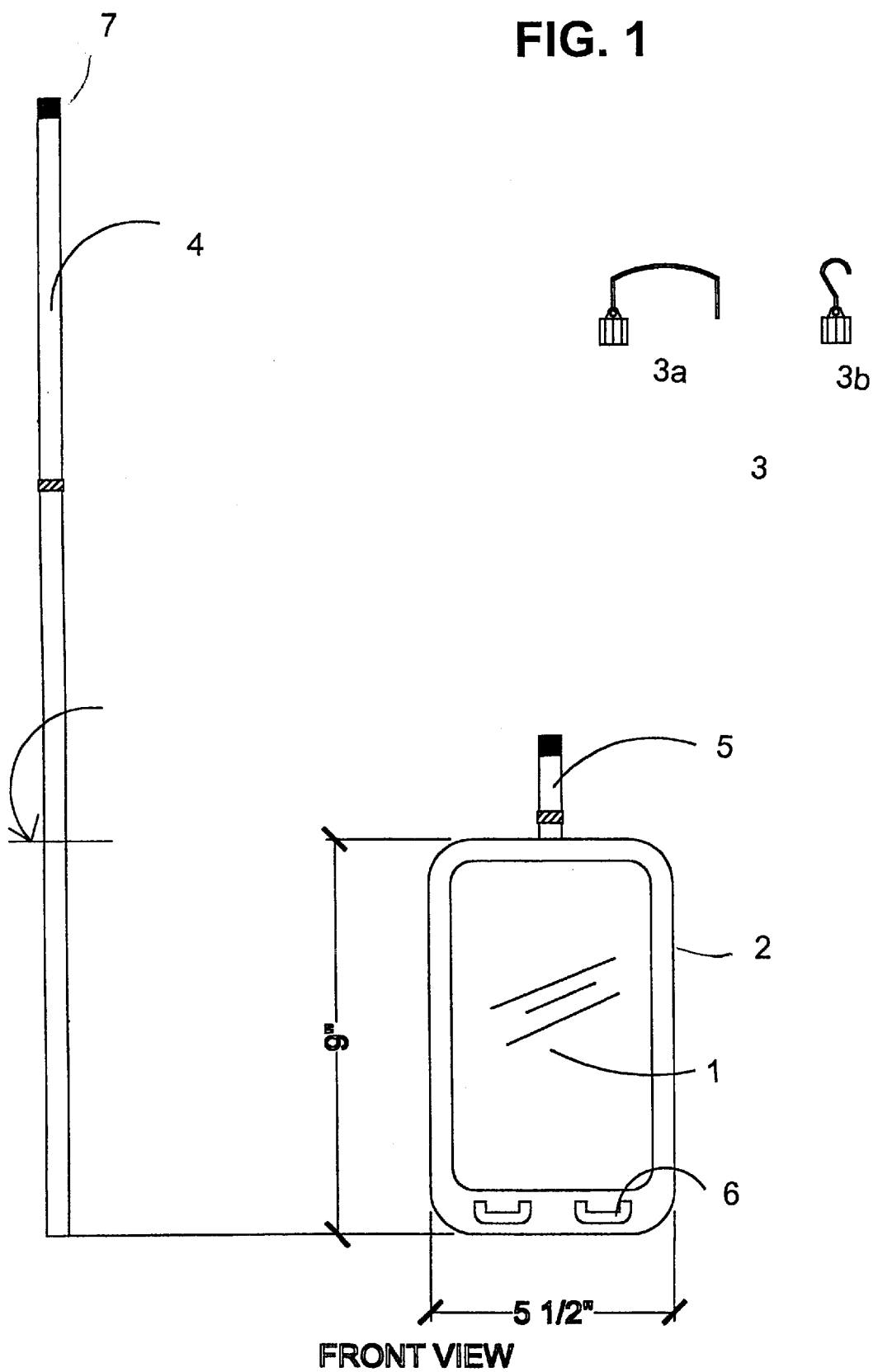
FIG. 1 is a diagrammatic perspective view, illustrating a front view of the shower mirror of the present invention.

FIG. 1 illustrates a shower mirror comprising a mirror element (1), a housing (2) enclosing the mirror element, a hanging device (3) and an extendable pole (4) having two ends, one end of the pole being molded to the housing, the other end of the pole (7) capable of being threadably connected to a hanging device.

The mirror element (1) of the invention is made of glass or plastic, preferably fog free glass or fog free plastic. Fog free glass or plastic can be provided by using any number of commercially available defogging means such as special materials or coatings that are applied to the surface of a mirror.

The housing (2) encompassing the mirror is made of plastic or metal and can include hooks (6) for storing a razor. The housing of the mirror can be of any size and dimensions, and is preferably 9 inches high by 5.5 inches wide.

The extendable pole (4) can be of the type used as an extension pole for paint rollers such as the telescoping extending type. The extendable pole (4) is connected at one end to the mirror housing (2) by conventional connection means, such as molding into the housing, and is threaded at the other end (7) allowing for the connection of a hanging device (3).

A preferred extendable pole is a telescopic pole, such as a paint roller extender, and is in three sections. The first section is molded into the housing, the second section extends 8.5 inches above the housing and the third section extends a further 8.5 inches from the end of the second section. Therefore, taken together, the two latter sections extend 17 inches from the top of the housing, at full extension. The mirror height can be adjusted up or down to fit the desired height of the person using it by holding the base of the pole (4) and turning counterclockwise to loosen and adjust. The pole is also tightened in position by turning clockwise to lock. The extendable pole (4) can be extended to a height of 17 inches and can also be adjusted down to be flush with the top of the mirror. Alternatively, the sections of the pole, when extended, can be locked by, for example, a screw lock.

A preferred hanging device (3b) allows the pole (4), with the attached mirror and housing, to be hung from a shower curtain pole. Another preferred hanging device (3a) allows the pole, with the attached mirror and housing, to be hung from a sliding glass shower door.

Figure 2:
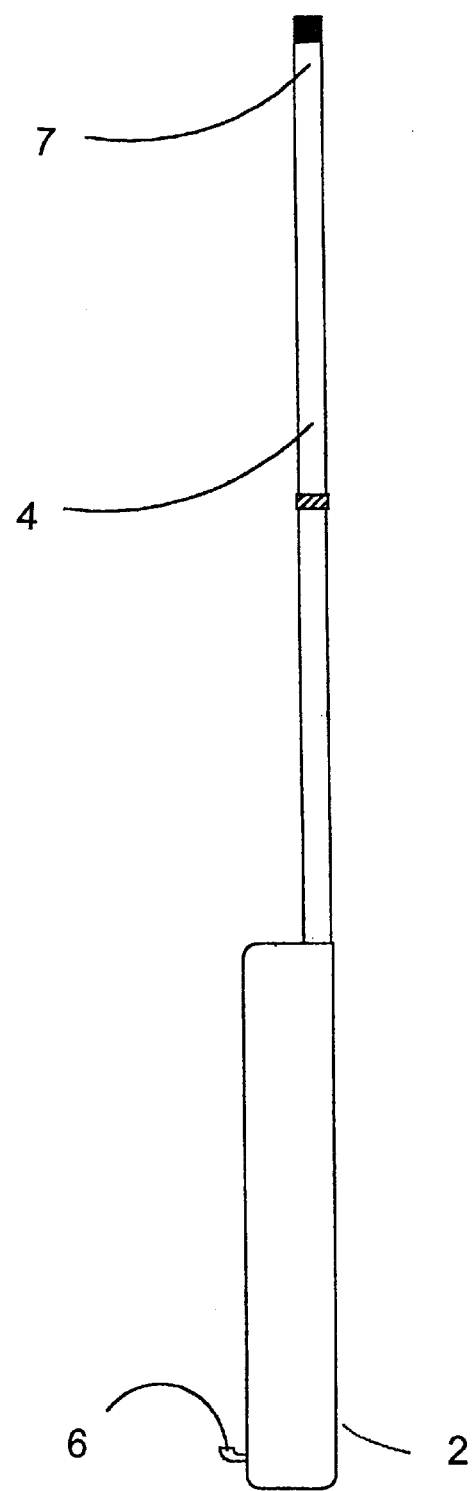
FIG. 2 is a diagrammatic perspective view, illustrating a side view of the shower mirror of the present invention.

FIG. 2 illustrates a side view of a preferred embodiment of the present invention.

Figure 3:
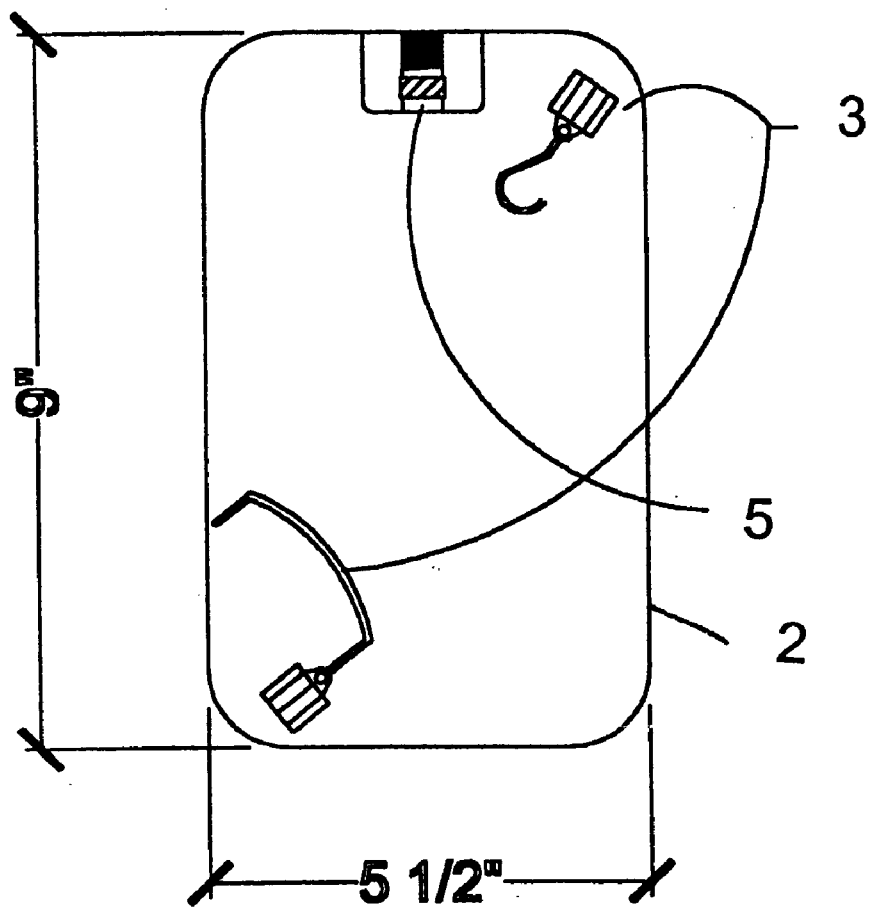
FIG. 3 is a diagrammatic perspective view, illustrating a rear view of the shower mirror the present invention.

FIG. 3 illustrates a rear view of the mirror housing (2). The hanging devices (3) can be clipped into the rear of the mirror housing for storage.

In conclusion, a personal shower mirror with an extendable pole is presented which attaches either onto a shower curtain pole or onto a sliding glass shower door, and provides a user with a fog free mirror.

What is claimed is:

1. A personal shower mirror, comprising:

a mirror element;

a housing enclosing said mirror element;

a removable hanging device that is hangable from a shower curtain pole; and an extendable pole having two ends, one end of said pole being connected to said housing, the other end of said pole having a threaded structure, wherein said threaded structure is affixed to said hanging device, and the extendable pole can be adjusted down to be flush with the top of the housing.

2. The personal shower mirror of claim 1, wherein the extendable pole is a telescopic pole.

3. The personal shower mirror of claim 1 wherein the mirror element is a fog-free glass mirror element.

4. The personal shower mirror of claim 1 wherein the mirror element is a fog-free plastic mirror element.

5. The personal shower mirror of claim 1 wherein the housing further comprises hooks for storage of a razor.

6. The personal shower mirror of claim 1 wherein the housing has dimensions 9 inches high by 5.5 inches wide.

7. A personal shower mirror, comprising:

a mirror element;

a housing enclosing said mirror element;

a hanging device; and an extendable pole having two ends, one end of said pole being connected to said housing, the other end of said pole having a threaded structure for affixing said hanging device, wherein the extendable pole can be adjusted down to be flush with the top of the housing and the hanging device is clipped into the rear of the housing for storage.

8. The personal shower mirror of claim 1 wherein the hanging device is hangable from a shower curtain pole.

9. The personal shower mirror of claim 1 wherein the hanging device is hangable from sliding glass doors.

10. A personal shower mirror, comprising:

a mirror element;

a housing enclosing said mirror element;

a removable hanging device that is hangable from a shower curtain pole; and an extendable pole having two ends, one end of said pole being connected to said housing, the other end of said pole having a threaded structure, wherein said threaded structure is affixed to said hanging device, wherein the extendable pole is a telescopic pole and wherein the telescopic pole is comprised of a first section, a second section and a third section, said first section being molded to said housing, said second section extending up to 8.5 inches from the top of said housing and said third section extending up to 8.5 inches from the top of the second section and wherein the extendable pole can be adjusted down to be flush with the top of the housing.

11. The personal shower mirror of claim 10 wherein the extendable pole can be extended to 17 inches above the housing.

12. The personal shower mirror of claim 10 wherein the mirror element is a fog-free glass mirror element.

13. The personal shower mirror of claim 10 wherein the mirror element is a fog-free plastic mirror element.

14. The personal shower mirror of claim 10 wherein the housing further comprises hooks for storage of a razor.

15. The personal shower mirror of claim 10 wherein the housing has dimensions 9 inches high by 5.5 inches wide.

16. The personal shower mirror of claim 10 wherein the hanging device is clipped into the rear of the housing for storage.

17. The personal shower mirror of claim 10 wherein the hanging device is hangable from a shower curtain pole.

18. The personal shower mirror of claim 10 wherein the hanging device is hangable from sliding glass doors.

19. A personal shower mirror, comprising:

a mirror element;

a housing enclosing said mirror element;

a removable hanging device that is hangable from sliding glass doors; and an extendable pole having two ends, one end of said pole being connected to said housing, the other end of said pole having a threaded structure, wherein said threaded structure is affixed to said hanging device, and the extendable pole can be adjusted down to be flush with the top of the housing.

20. A personal shower mirror, comprising:

a mirror element;

a housing enclosing said mirror element;

a removable hanging device that is hangable from sliding glass doors; and an extendable pole having two ends, one end of said pole being connected to said housing, the other end of said pole having a threaded structure, wherein said threaded structure is affixed to said hanging device, wherein the extendable pole is a telescopic pole and wherein the telescopic pole is comprised of a first section, a second section and a third section, said first section being molded to said housing, said second section extending up to 8.5 inches from the top of said housing and said third section extending up to 8.5 inches from the top of the second section and wherein the extendable pole can be adjusted down to be flush with the top of the housing.

\* \* \* \* \*